United States Patent
Clay et al.

[11] 3,754,808
[45] Aug. 28, 1973

[54] HOLOGRAPHIC READOUT SYSTEM EMPLOYING PREDISPERSION DIFFRACTION GRATING

[75] Inventors: Burton Ross Clay, Wayland; Douglas Alan Gore, Billerica, both of Mass.

[73] Assignee: The United States of America as represented by the Secretary of the Navy, Washington, D.C.

[22] Filed: Aug. 30, 1971

[21] Appl. No.: 176,178

[52] U.S. Cl. ............................. 350/3.5, 350/162 R
[51] Int. Cl. ............................................ G02b 27/00
[58] Field of Search ...................... 350/3.5, 162 R; 161/3.5

[56] References Cited
UNITED STATES PATENTS
3,695,744  10/1972  Clay ...................................... 350/3.5
3,580,655  5/1971  Leith et al. ........................... 350/3.5
3,603,668  9/1971  De Bitetto ........................... 350/162 R

*Primary Examiner*—Ronald L. Wibert
*Assistant Examiner*—Ronald J. Stern
*Attorney*—Richard S. Sciascia and Henry Hansen

[57] ABSTRACT

A hologram recorded with coherent wave energy of a predetermined wavelength is read out with broad-band energy by employing a predispersion diffraction grating for angularly dispersing broad-band wave energy incident thereon to provide each angular component of the output beam derived therefrom with a different angular orientation with respect to the hologram. By appropriately selecting the line spacing of the diffraction grating with respect to the period of the spatial carrier of the hologram, a hologram read out with the output beam of the grating may have the respective reconstructed images corresponding to each component wavelength positioned in substantial coincidence with each other.

6 Claims, 4 Drawing Figures

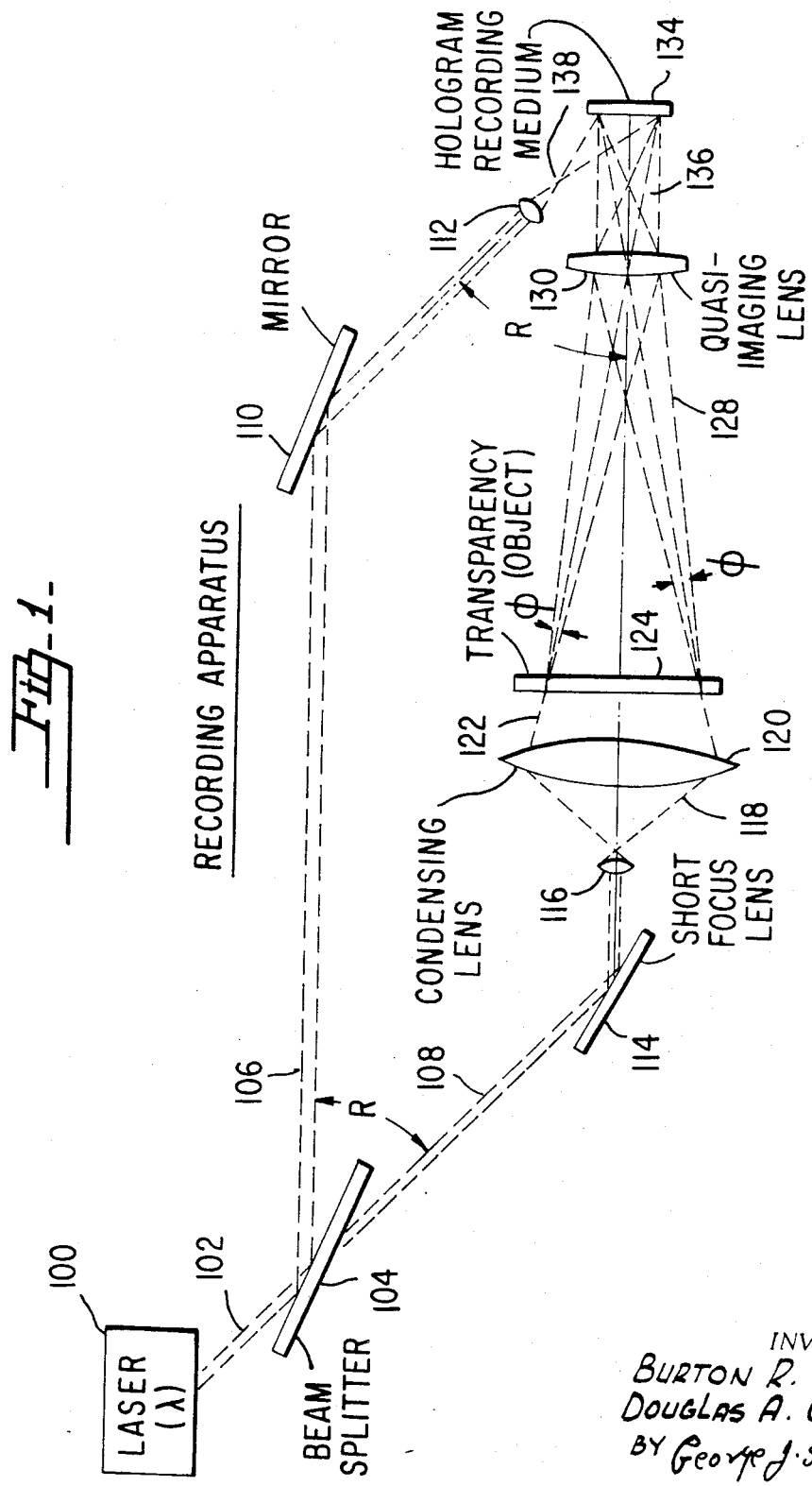

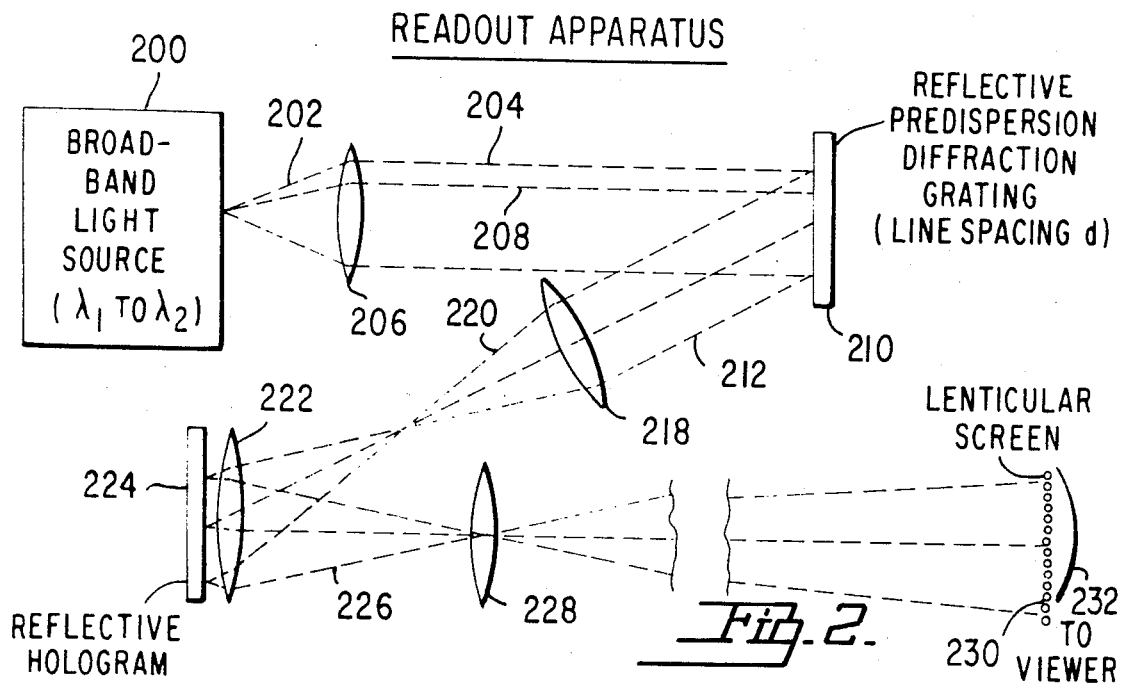
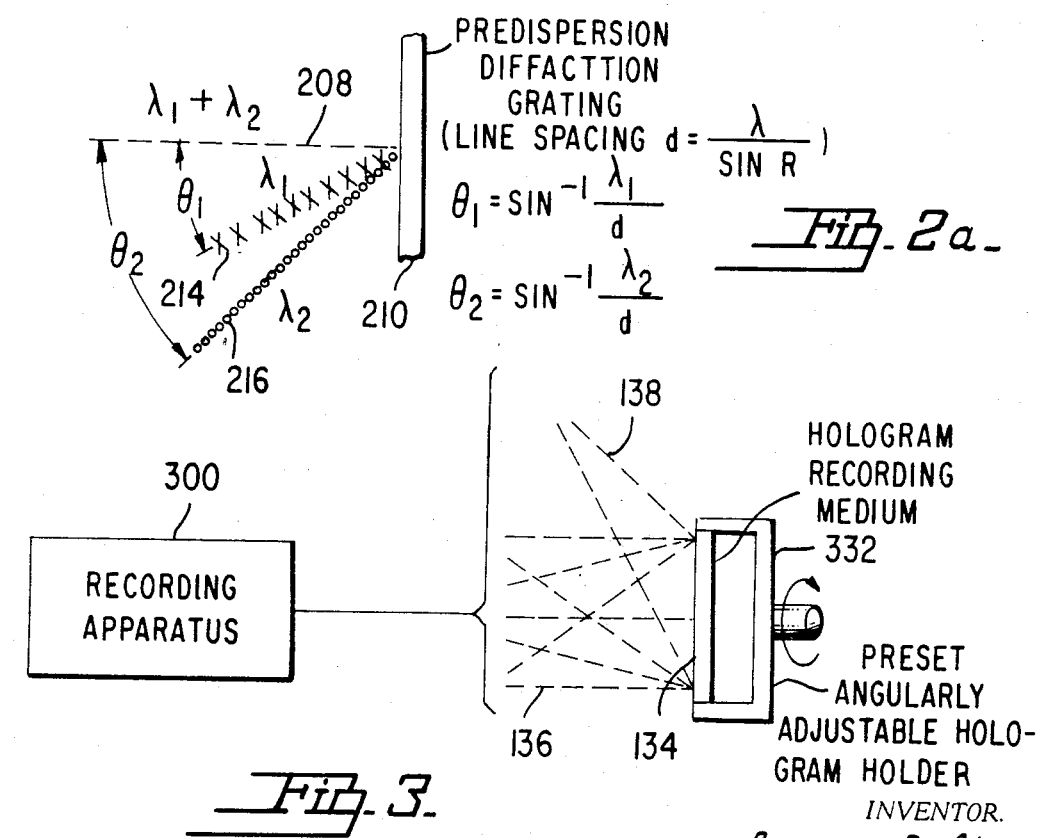

3,754,808

HOLOGRAPHIC READOUT SYSTEM EMPLOYING PREDISPERSION DIFFRACTION GRATING

The invention herein described was made in the course of or under a contract or subcontract thereunder with the Department of the Navy.

This invention relates to holograms, and more particularly, to a system for reading out holograms with broad-band wave energy.

At present, there are three types of holograms which can be read out with broad-band wave energy, such as white light, rather than requiring extremely narrow band wave energy, such as monochromatic or even coherent light. The first of these three basic categories consists of volume holograms in which information is recorded in layers of absorptive regions or refractive index variation throughout the medium of many wavelength thickness (Lippman-Bragg). Volume holograms produce bright sharp images but are difficult to reconstruct and impossible to replicate.

As opposed to volume holograms, thin or surface holograms can be easily replicated. For instance, a thin amplitude hologram, which is made up of points of varying density, can be replicated photographically by contact printing; while thin phase holograms in the form of a relief pattern may be replicated by casting or hot pressing techniques.

The second and third of the three basic categories of holograms which may be read out with broad-band wave energy, such as white light, are both thin holograms and, thus, may be replicated. However, they have other disadvantages. In particular, the second category of holograms which may be read out with white light consists of Fourier transform holograms which must use small reference beam angles during recording and very highly filtered white light for playback. The required narrow band width of the reconstruction filter greatly light utilization and image brightness. The third category of holograms which may be read out with broad-band wave energy, such as white light, consists of image plane or focused image holograms in which an image of the object is focused in the recording plane of the hologram. The problem with image plane or focused image holograms is that they inherently lack the capability of redundancy. As is known, redundant holograms (which employ a non-focused or an out-of-focus object-information beam in the recording thereof) have desirable features not found in non-redundant holograms which, among others, include the prevention of the loss of information in the reconstructed image due to scratches or dirt on the hologram.

The present invention is directed to a technique which makes it possible to read out a thin hologram, which may be a redundant hologram, with borad-band wave energy or white light in a manner in which most, if not substantially all, of the available wave energy is utilized and contributes to the image brightness of the holographic reconstructed image being read out.

Briefly, in accordance with the principles of this invention, a predispersion diffraction grating is employed which has a selected line spacing chosen to provide an amount of angular dispersion in incident broad-band wave energy sufficient to compensate for changes in position of the reconstructed image of a hologram caused when a hologram is read out with wave energy of a different wave length from that utilized in recording the hologram.

This and other features and advantages of the present invention will be made more apparent in the following detailed description taken together with the accompanying drawing, in which:

FIG. 1 is a diagrammatic showing of a preferred embodiment of recording apparatus employed in recording a hologram which may be read out by the technique of the present invention;

FIG. 2 is a preferred embodiment of reading apparatus employing the principles of the present invention for reading out a hologram recorded by the apparatus of FIG. 1;

FIG. 2a is a fragmentary view of a portion of the readout apparatus shown in FIG. 2, illustrating the angular dispersion of the wave energy incident on the predispersion diffraction grating, and FIG. 3 shows a modification of the recording apparatus of FIG. 1.

Referring now to FIG. 1, there is shown recording apparatus for recording a hologram. Although in the preferred embodiment shown in FIG. 1, the hologram is a so-called quasi-imaged hologram, this need not be the case. The predispersing technique of the present invention is applicable with equal force to other types of hologram recording apparatus for recording other types of holograms, such as Fresnel holograms, Fourier-transform holograms and Fraunhofer holograms, for instance.

Specifically, the recording apparatus of FIG. 1 comprises laser 100, which emits a beam of coherent light at a given wavelength $\lambda$. For instance, laser 100 may be a He-Cd laser and $\lambda$ may be the blue light emitted thereby. Beam 102 is incident on beam splitter 104, which may be a partially reflecting mirror, which splits beam 102 into first component 106 reflective therefrom and second component 108 transmitted therethrough. First component 106, after reflection from mirror 110, is incident on convex lens 112. Second component 108, after reflection from mirror 114, is incident on short focus lens 116.

Emerging from short focus lens 116 is expanded beam 118, which is incident on condensing lens 120. Convergent light beam 122, emerging from condensing lens 120, is spatially-modulated in intensity by the information on transparency 124. In addition to intensity modulating the light passing through transparency 124, the spatial information on transparency 124 diffracts the light passing therethrough by an amount which depends upon the values of the spatial frequency components of the spatial information. In particular, the highest spatial frequency component, corresponding to the smallest bit size (highest resolution) of the spatial information on transparency 124 results in portions of intensity-modulated light beam 128 corresponding to these higher spatial frequency components being diffracted by an angle $\phi$.

Quasi-imaging lens 130, which is a convex lens having a predetermined focal length and a predetermined width, or aperture, is located, as shown, in coaxial relationship with lenses 116 and 120 and transparency 124, at a given distance from transparency 124. This given distance, which is the effective object distance of quasi-imaging lens 130, is selected so that the aperture of lens 130 subtends the diffraction angle $\phi$, as shown. In this manner, portions of intensity-modulated beam 128, modulated by each separate spatial information point of transparency 124, illuminates the entire aperture of lens 130, without the need for any additional optics therebetween.

Located a certain distance on the other side of lens 130 is hologram recording medium 134. Beam 128, after passing through lens 130, forms information component beam 136, which is incident on medium 134 with a spherical wavefront having a certain curvature. The focal length of lens 112 and the distance of lens 112 from medium 134 is chosen so that reference beam component 138 is incident on medium 134 with a spherical wavefront which has a curvature substantially equal to aforesaid certain curvature of the incident wavefront of information component 136. Further, as shown, the mean direction of reference beam 138 is angularly offset from the mean direction of information component 136 by an angle of R.

Quasi-imaging lens 130 forms a real image of the scene depicted by transparency 124 in an image plane which is located a predetermined distance to the right of lens 130, and which depends upon the object distance between transparency 124 and lens 130 in the focal length of lens 130. The photosensitive surface of recording medium 134 is spaced somewhat ahead or behind the image plane. It is for this reason that lens 130 is referred to as a "quasi-imaging" lens, rather than an "imaging" lens.

Considering now the operation of the recording apparatus shown in FIG. 1, it will be assumed solely for the purpose of this discussion that laser 100 is a He-Cd laser and that the wavelength of coherent light beam 102 is the characteristic blue wavelength of a He-Cd laser.

In operation, laser 100 is operated, either by means of a shutter (not shown) and laser 100 or by pulsing of laser 100, to emit beam 102 for a preselected short duration. During this short duration, the photosensitive surface of medium 134 is simultaneously exposed to information component beam 136 and reference component beam 138. These two beams interfere with each other at the photosensitive surface of hologram recording medium 134 to record a hologram of the scene depicted by a transparency 124 over a given area thereof. The length of the short duration is chosen to provide sufficient exposure time for the recording of this hologram.

The photosensitive surface of hologram recording medium 134 may be a conventional photographic silver emulsion or any type of light sensitive medium having a resolving power sufficient to record a hologram. However, there is a particular benefit in employing a photoresist as the photosensitive surface of medium 134. In particular, a photoresist hologram recording medium, after exposure and development, manifests the recorded hologram thereon as a relief pattern hologram, and is therefore useful as a master recording from which duplicate copies may be made either directly or indirectly by casting or hot pressing. The duplicate copies may be made either in a transmissive material, such as transparent vinyl, or in a reflective material, such as reflectively-coated vinyl.

Before proceeding with a description of the readout apparatus shown in FIG. 2 employed for playing back a hologram, the desirability of "quasi-imaging" will be discussed.

The depth of focus $f_d$ of a lens is defined as follows:

$$f_d = \frac{1}{2}(f/A)^2 \lambda,$$

where $f$ is the focal length of the lens, $A$ is the aperture of the lens, and $\lambda$ is the incident light wavelength.

As disclosed above, medium 134 in FIG. 1 is spaced somewhat from the image plane of quasi-imaging lens 130. The reason for this is that the lack of any redundancy in a focused image hologram means that, during playback, the hologram recording medium which is normally made of vinyl or some other relatively soft material (and is therefore subject to scratches), will cause substantial loss of portions of the reconstructed image. On the other hand, by spacing medium 134 from the image plane of lens 130, a certain amount of redundancy results which mitigates the degradation of the reconstructed image due to scratches and dust on the hologram recording medium during playback. It has been found that the effective range of spacing distance between the image plane of lens 130 and the photosensitive surface of medium 134 extends up to 20 times the depth of focus $f_d$ of imaging lens 130, regardless of whether medium 134 is located on one side or the other of the imaging plane. However, previous to the present invention, the price which had to be paid for this redundancy was that the greater the value of the spacing distance, and hence the greater the amount of redundancy, the more nearly monochromatic did the incident light employed in reading out the hologram have to be.

Referring now to FIG. 2, there is shown readout apparatus for a reflective hologram of the type recorded by the apparatus of FIG. 1, as mentioned above. In particular, the broad-band light source 200, which may be a heated tungsten filament, provides light having component wavelengths which extend over a range from $\lambda_1$ to $\lambda_2$. Broad-band light source 200 emits divergent light beam 202 which is collimated into plane-wave beam 204 by lens 206. Beam 204 includes many parallel rays of light, such as ray 208.

Located in the path of beam 204 is a reflective predispersion diffraction grating 210, having a line spacing $d$. Preferably, grating 210 is a blazed grating having high optical efficiency.

Reflectively diffracted from grating 210 is dispersed beam 212, which travels generally in the mean direction shown in FIG. 2. However, since diffraction grating 210 disperses the broadband light incident thereon, each component wavelength actually will travel in a somewhat different direction which depends upon its wavelength.

Referring for a moment to FIG. 2a, for illustrative purposes there is shown the fragmentary portion of grating 210 on which broad-band light ray 208 of beam 204 is incident. In particular, as shown in FIG. 2a, incident ray 208 is composed of a broad-band of component wavelengths extending from its shortest component wavelength $\lambda_1$ to its longest component wavelength $\lambda_2$. Dispersion by predispersion diffraction grating 210 of component wavelength $\lambda_1$ will result in this shortest wavelength component $\lambda_1$ being reflectively diffracted from grating 210 as ray 214 and longest wavelength component $\lambda_2$ being reflectively diffracted from diffraction grating 210 as ray 216.

Since, as shown in FIG. 2 and 2a, grating 210 is oriented normal to incident beam 204 and incident ray 208, the entire angle $\theta_1$ between ray 208 and ray 214 and the entire angle $\theta_2$ between ray 208 and ray 216 are due to diffraction by grating 210. Therefore, the respective values of angle $\theta_1$ and $\theta_2$ are given, as indicated in FIG. 2a, by the following equations:

$$\theta_1 = \sin^{-1} \lambda_1/d \qquad 2.$$

$$\theta_2 = \sin^{-1} \lambda_2/d \qquad 3.$$

It might be pointed out that it is not essential that diffraction grating 210 be oriented normal to beam 204 and ray 208 in FIGS. 2 and 2a, although this is the preferred condition because the angle of reflection in this case is zero. If the orientation of grating 210 with respect to incident beam 204 is oblique, so that the angle of reflection is not zero, then equations (2) and (3) refer only to the portion of the respective angles between ray 214 and 208 and between ray 216 and ray 208 which are due to diffraction and not to reflection.

The angular orientation of mean beam 212 in FIG. 2 with respect to grating 210 in FIG. 2 is considered to be along the bisector of the angle in FIG. 2a defined by beams 216 and 214. Since in practice the difference between $\theta_2$ and $\theta_1$ is relatively small, the divergence between rays 214 and 216 can be neglected for the moment in the discussion of FIG. 2. However, the effect of this divergence between rays 214 and 216 will be discussed in detail later in connection with FIG. 2a.

Returning to FIG. 2, the dispersed beam 212 is incident on readout beam forming lens 218. Lens 218 alters the curvature of the waves passing therethrough to form readout beam 220. Readout beam 220, after passing through field lens 222, is incident on the surface of reflective hologram 224, which is oriented in fixed (preferably parallel) orientation with grating 210. The holographic information on hologram 224, which was originally recorded by the recording apparatus of FIG. 1, reflectively diffracts the incident readout light which passes again through field lens 222 to produce hologram output beam 226. Imaging lens 228 serves to image the reconstructed image of the hologram on lenticular screen 230, as shown, where it can be viewed by a viewer situated to the right of screen 230. Lenticular screen 230 includes lens portion 232 for imparting favorable directionality to the light to cause the image to appear brighter when viewed from a region defined by the direction of the emerging light, as is known.

The purpose of field lens 222 in FIG. 2 is to converge output beam 226 and thereby limit the required aperture size of imaging lens 228 needed to intercept substantially all the light in beam 226. Furthermore, the curvature of beam 220 (after passing through field lens 222), which is incident on the surface of reflective hologram 224 should be substantially equal to the curvature of reference beam 138 in FIG. 1. Therefore, the focal length and positioning of reference beam forming lens 218, and field lens 222 are chosen so that reference beam 220, after passing through field lens 222, will have this required incident curvature at the surface of reflective hologram 224.

As is known, a holographic interference pattern consists of a spatially modulated spatial carrier. The wavelength of the spatial carrier is determined by the wavelength employed in recording the hologram and by the angular separation between the respective object-information and reference beams employed in recording the hologram. In particular, with reference to the recording apparatus shown in FIG. 1, the spatial carrier has a period p, given by the following equation:

$$p = \lambda/\sin R, \qquad 4.$$

where $\lambda$ is the recording wavelength and $R$ is the angle between the respective object-information and reference beams.

Returning now to FIG. 2a, it is indicated that the line spacing d of reflecting predispersion diffraction grating 210 is given by the following equation:

$$d = \lambda/\sin R \qquad 5.$$

Thus, the line spacing d of reflecting predispersion diffraction grating 210 is chosen to be equal to the period p of the spatial carrier of the recorded hologram being read out.

When a recorded hologram is read out, the angle of diffraction between the zero order of diffraction and one of the pair of first orders of diffraction is defined by the following equation:

$$\sin \alpha = \lambda_r/p \qquad 6.$$

where $\alpha$ is the readout angle of diffraction, $\lambda_r$ is the wavelength of the readout wave energy and $p$ is the period of the spatial carrier of the recorded hologram. Substituting equation (4) in equation (6) gives the following:

$$\sin \alpha = \lambda_r/\lambda \sin R \qquad 7.$$

From equation (7) it will be seen that only in the special case where the readout wavelength $\lambda_r$ is equal to the recording wavelength $\lambda$ will the readout diffraction angle $\alpha$ equal the angular separation R between the respective object-information reference beams employed in recording the hologram. In general, the angle of diffraction $\alpha$ will be different from the angle R and where the readout wave energy is broad-band, which it is in the case under discussion, the value of the diffraction angle $\alpha$ for each respective separate component wavelength of the broad-band wave energy necessarily will be, in accordance with equation (7), different from each other. However, all of the respective first diffraction orders, corresponding to each different component wavelength of broad-band wave energy, can be brought into coincidence with each other if the angular orientation of the zero order corresponding to each different one of the component wavelengths is rotated by an appropriate amount which depends on that component wavelength. Since the angular orientation of the zero order with respect to the hologram being read out depends solely on the angle of the incident readout beam with respect thereto, coincidence of the first diffraction orders for all the component wave lengths may be achieved by employing the correct different angles for the respective portions of the readout beam corresponding to each component wavelength. The dispersion resulting from the use of reflective predispersion diffraction grating 210 provides these correct different angles.

In particular, due to the geometry of the readout apparatus in FIG. 2, with grating 210 and reflective hologram 224 being disposed in parallel relationship with respect to each other, and due to the fact that the line spacing $d$ of grating 210 is equal to the carrier period $p$ of reflective hologram 224, the dispersion in the component wavelengths of the broad-band wave energy defined by equations (2) and (3) will be just that necessary to provide the proper angular offset in the respective portions of the readout beam corresponding to each separate component wavelengths which will result in the desired coincidence of all the respective first diffraction orders. Thus, the wavelength dependence of the holographically diffracted light is effectively eliminated so far as the spatial carrier is concerned.

Although the present invention causes chromatic error cancelation over the whole field of view for background information, corresponding to the spatial carrier, it still does leave errors due to the modulation terms which define the amount of image magnification. Thus, a red component of the reconstructed image would be larger than a blue component. In particular, the image size is defined by the angle at which the principle ray arrives in a restoration plane and the distance from this plane to the imaging lens. The value of this angle should be the same for all wavelengths in order for there to be zero errors, but actually the value of this angle varies over a small angular interval. Thus, the actual error on axis is zero, but it increases with increased system field of view. For holograms with relatively small fields of view, which is the usual case, these errors in magnification are small and can be tolerated.

Although FIG. 2 specifically uses a reflective predispersion diffraction grating for reading out a reflective hologram with broad-band wave energy, the grating and/or the hologram may, of course, be transmissive, rather than reflective, without departing from the teachings of the present invention.

The broad-band of wave energy extending from $\lambda_1$ to $\lambda_2$ usually, but not necessarily, includes as one of the component wavelengths thereof the recording wavelength $\lambda$. Thus, for instance, the recording wavelength $\lambda$ may be the blue line of a He-Cd laser, while the broad-band wave energy may be essentially white light emitted from a heated tungsten filament, which is capable of providing, with high optical efficiency, a bright reconstructed image of the scene manifested by the hologram.

The benefits of reading out a hologram with broadband wave energy is not limited to the use of white light. For instance, there are systems for holographically recording a multi-color scene and thereafter reconstructing an image of this scene in full color from such a recorded hologram.

One such system, which is described in detail in copending patent application Ser. No. 106,485, filed Jan. 14, 1971, now U.S. Pat. No. 3,695,744 by Burton R. Clay, and assigned to the same assignee as the present invention, discloses the use of recording apparatus to holographically record a multi-color scene. This recording apparatus is the same as that shown in FIG. 1 in all respects except for the modification shown in FIG. 3. In particular, in FIG. 3, recording apparatus 300, which is identical to the recording apparatus of FIG. 1, is capable of simultaneously illuminating hologram recording medium 134 with object-information beam 136 and reference beam 138, all of which are identical to the correspondingly numbered elements of FIG. 1. FIG. 3 differs from FIG. 1 only in that hologram recording medium 134 is supported by preset angularly adjustable hologram holder 332. Hologram holder 332 is rotatable about its axis to permit holder 332 to be adjusted to any one of a plurality of different preset angular positions. The meridional angle of medium 134 is, therefore, determined by the preset angular position to which holder is adjusted.

In operation, a first color separation transparency manifesting a first of the three primary additive colors, such as red, is first utilized as transparency 124 of FIG. 1. Hologram holder 332 is angularly adjusted to orient hologram recording medium 134 in a first preset angular position thereof, and a first hologram is recorded on medium 134.

After the first hologram has been recorded, hologram holder 332 is rotated to a second preset angular position thereof, and the first color separation transparency is replaced by a second color separation transparency manifesting a second additive color component, such as green, of the multi-color scene.

After the second hologram has been recorded on medium 134, holder 332 is rotated to a third preset angular position thereof, and a hologram of a third color separation transparency manifesting a third primary additive color component, such as blue, of the same multi-color scene is recorded.

Thus, recorded on medium 134 in stacked relationship and at different preset meridional angles with respect to medium 134 are three separate holograms manifesting respectively the red, green and blue components of the same multi-color scene.

In reading out such a hologram to obtain a full color reconstructed image, it is necessary to simultaneously employ separate red, green and blue readout beams, which are respectively oriented at meridional angles corresponding respectively to the red, green and blue-manifesting holograms. Each of these three separate colored readout beams is usually obtained by employing a separate, highly filtered white light source to provide a narrow-band, substantially monochromatic, red, green or blue readout beam, as the case may be. Thus, for each of these colored readout beams, most of the white light is absorbed by the filter, reducing to a great degree the optical efficiency of the readout apparatus and the brightness of the reconstructed image in full color which is obtained.

As is known, a broad-band filter can be used to filter white light to provide a mixture of wavelengths of various relative amplitudes, which mixture to the eye appears to have a given color, such as red, green or blue. The present invention may be employed to obtain with high optical efficiency brighter reconstructed images in full color by generating each of the three required separate readout beams utilizing a white light source with a broad-band filter together with individual predispersion diffraction grating for each of the three respective readout beams.

What is claimed is:

1. A system for reading out a hologram with broadband wave energy, wherein said hologram has been recorded employing respective angularly-separated object-information and reference beams of mutually coherent wave energy of a predetermined wavelength, whereby said hologram constitutes a spatially-modulated spatial carrier in which said spatial carrier has a period which is determined by said predetermined wavelength and the angular separation between said respective object-information and reference beams; said system comprising:

a. a predispersion diffraction grating having a selected line spacing responsive to illumination thereof by a beam of broad-band wave energy for angularly dispersing said broad-band wave energy by an amount which is determined by the respective wavelengths included in said broad-band wave energy and by said selected line spacing, b. first means for illuminating said predispersion diffraction grating with a beam of broad-band wave energy including component wavelengths having predetermined values with respect to that of said predetermined wavelength to thereby derive an angularly-dispersed output beam of wave energy in which each component wavelength thereof has an angular orientation determined by the value of that component wavelength and the value of said selected line spacing of said grating, c. second means including said hologram disposed in cooperative spaced relationship with said grating to effect the illumination of said hologram with wave energy of said angularly-dispersed output beam and resulting in respective reconstructed images being formed by said hologram for each of said component wavelengths, the relative position in space of each of said respective reconstructed images being determined by the value of each respective component wavelength with respect to the period of the spatial carrier of said hologram and the angular orientation of that respective component wavelength, d. wherein the value of said selected line spacing of said predispersion diffraction grating with respect to the value of the period of said spatial carrier of said hologram is that which results in the appropriate amount of angular dispersion of said broad-band wave energy required to register the positions of said respective reconstructed images in substantial coincidence with each other, and e. wherein said respective object-information and reference beams employed in recording said hologram were spherical waves having substantially the same incident curvature at the hologram recording, wherein said first means includes third means for illuminating said predispersion grating with a substantially plane wave of said broad-band wave energy, and wherein said second means includes fourth means responsive to said angularly-dispersed output beam for converting said output beam to a spherical-wave beam having a curvature incident on said hologram which corresponds with the incident curvature of said respective object-information and reference beams at said hologram recording.

2. The system defined in claim 1, wherein said predetermined line spacing of said predispersion diffraction grating is substantially equal to the period of the spatial carrier of said hologram.

3. The system defined in claim 2, wherein said hologram is oriented in substantially parallel relationship with respect to said predispersion diffraction grating.

4. The system defined in claim 1, wherein said hologram is a redundant hologram.

5. The system defined in claim 1, wherein said broad-band wave energy includes said predetermined wavelength employed in recording said hologram as a component wavelength thereof.

6. The system defined in claim 1, wherein said broad-band wave energy extends between a first given component wavelength and a second given component wavelength, and wherein the relationship among said predispersion diffraction grating, said hologram and said first and second means is such that said respective first and second given component wavelengths of the angularly-dispersed output beam of said grating have respective angular orientations with respect to said hologram which are given in accordance with the following equations:

$$\sin \theta_1 = \lambda_1/\lambda \sin R$$
$$\sin \theta_2 = \lambda_2/\lambda \sin R$$

where $\lambda$ is said predetermined wavelength, R is the angular separation between said respective object-information and reference beams employed during recording of said hologram, $\lambda_1$ and $\lambda_2$ are respectively said first and second component wavelengths and $\theta_1$ and $\theta_2$ are respectively the angular orientations with respect to said hologram of said respective first and second given component wavelengths.

* * * * *